United States Patent
Lo

(10) Patent No.: US 7,925,438 B2
(45) Date of Patent: Apr. 12, 2011

(54) METHOD AND APPARATUS FOR DISPLAYING ROUTE GUIDANCE LIST FOR NAVIGATION SYSTEM

(75) Inventor: Eddy Lo, Torrance, CA (US)

(73) Assignee: Alpine Electronics, Inc., Tokyo (JP)

(*) Notice: Subject to any disclaimer, the term of this patent is extended or adjusted under 35 U.S.C. 154(b) by 597 days.

(21) Appl. No.: 11/980,233

(22) Filed: Oct. 30, 2007

(65) Prior Publication Data
US 2009/0112462 A1    Apr. 30, 2009

(51) Int. Cl.
*G01C 21/34* (2006.01)
*G01C 21/00* (2006.01)

(52) U.S. Cl. ........ 701/211; 701/210; 701/201; 701/206; 340/995.2; 340/990; 330/10

(58) Field of Classification Search .................. 701/209, 701/211
See application file for complete search history.

(56) References Cited

U.S. PATENT DOCUMENTS

| | | | | |
|---|---|---|---|---|
| 5,323,321 A * | 6/1994 | Smith, Jr. | | 701/211 |
| 5,537,323 A * | 7/1996 | Schulte | | 701/211 |
| 5,638,279 A * | 6/1997 | Kishi et al. | | 701/200 |
| 5,739,772 A * | 4/1998 | Nanba et al. | | 340/990 |
| 6,278,940 B1 | 8/2001 | Endo | | |
| 6,405,131 B1 * | 6/2002 | Barton | | 701/211 |
| 6,762,696 B2 * | 7/2004 | Hulverscheidt et al. | ... | 340/995.2 |
| 7,545,207 B2 * | 6/2009 | Chang et al. | | 330/10 |
| 2001/0041962 A1 * | 11/2001 | Sugawara et al. | | 701/211 |
| 2005/0027444 A1 * | 2/2005 | Kim | | 701/208 |
| 2005/0102102 A1 * | 5/2005 | Linn | | 701/210 |
| 2005/0273252 A1 * | 12/2005 | Nix et al. | | 701/201 |
| 2007/0271030 A1 * | 11/2007 | Deurwaarder | | 701/201 |
| 2008/0021641 A1 * | 1/2008 | Kim | | 701/209 |
| 2008/0208469 A1 * | 8/2008 | Obradovich et al. | | 701/213 |
| 2008/0288165 A1 * | 11/2008 | Suomela et al. | | 701/201 |

FOREIGN PATENT DOCUMENTS
EP     1626250 A1 *    2/2006

* cited by examiner

*Primary Examiner* — Thomas G Black
*Assistant Examiner* — Lin B Olsen
(74) *Attorney, Agent, or Firm* — Muramatsu & Associates

(57) ABSTRACT

A navigation system displays a route guidance list on a monitor screen in an intuitive and organized manner so that a user can easily understand information regarding the maneuvering locations and actions associated with the route to the destination. The route guidance list is structured in a layered manner so that the information regarding the maneuvering actions at the locations closer to the current user position will be prioritized. For example, in the route guidance list, the information regarding the immediate maneuvering location and action is more detailed, enlarged, and highlighted than the others. The navigation system displays the route guidance list in which the information regarding the maneuvering locations and actions will be dynamically changed in response to the changes of the current location of the user.

18 Claims, 11 Drawing Sheets

Prior Art

Fig. 1A

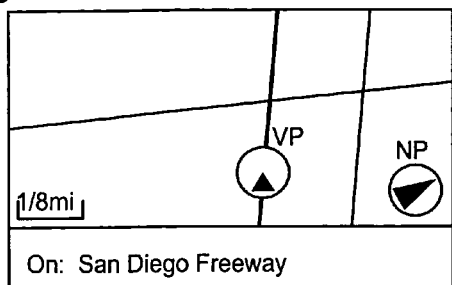

On: San Diego Freeway

Fig. 1B

| Dest | Find Destination by |
|---|---|
| Address | |
| Intersection | |
| Point of Interest | |
| Map Cursor | |
| Recent Route | |
| Address Book | |
| Today's Plan | |

Fig. 1C

| Dest | Find Point of Interest by |
|---|---|
| Place Name | |
| Place Type | |

Fig. 1D

| Dest | Select Category |
|---|---|
| ATM | |
| BANK | |
| GAS STATION | |
| HOSPITAL | |
| MOVIE THEATER | |
| RESTAURANT | |
| VETERINARIAN | |

Fig. 1E

| Dest | Select Name |
|---|---|
| Genkai 15435 Jeffrey Rd. Irvine, CA (949) 786-3420 | |
| Pizza Hut | |
| Genkai | |
| Hard Rock Cafe | |
| Sushi Boy | |

Fig. 1F

| Confirm Route |
|---|
| Genkai 15435 Jeffrey Rd. Irvine, CA (949) 786-3420 |
| By Quickest Route Method |
| OK to Proceed |
| Options |

Fig. 1G

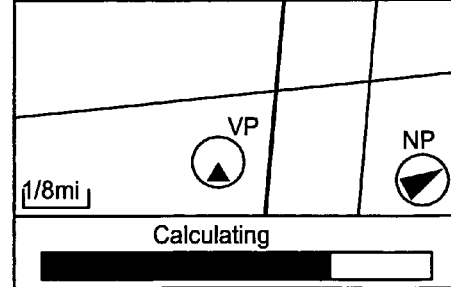

Calculating

Fig. 1H

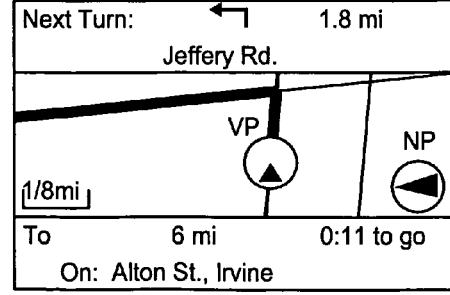

Next Turn: 1.8 mi
Jeffery Rd.
To  6 mi  0:11 to go
On: Alton St., Irvine

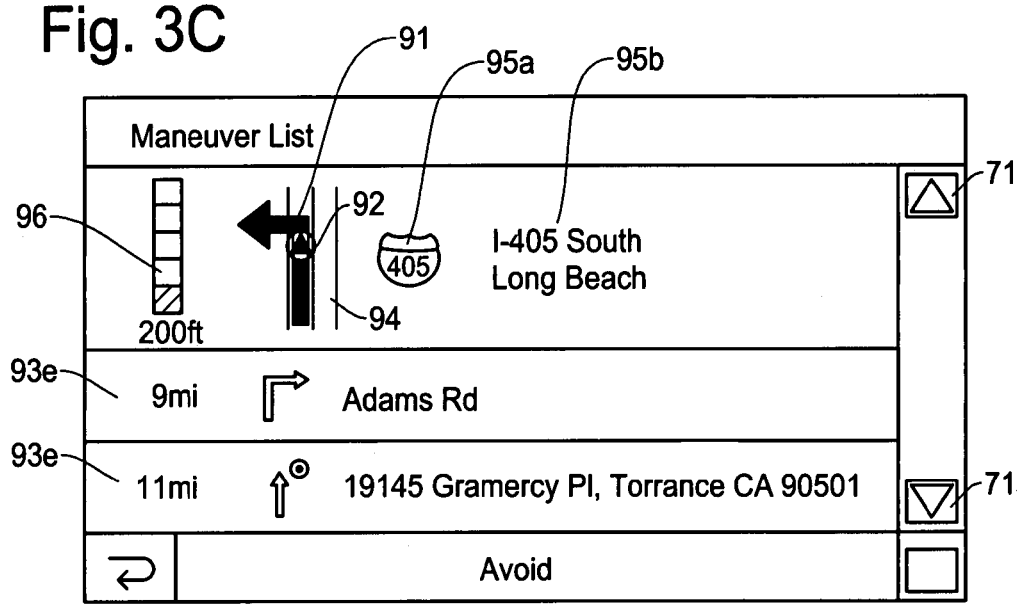
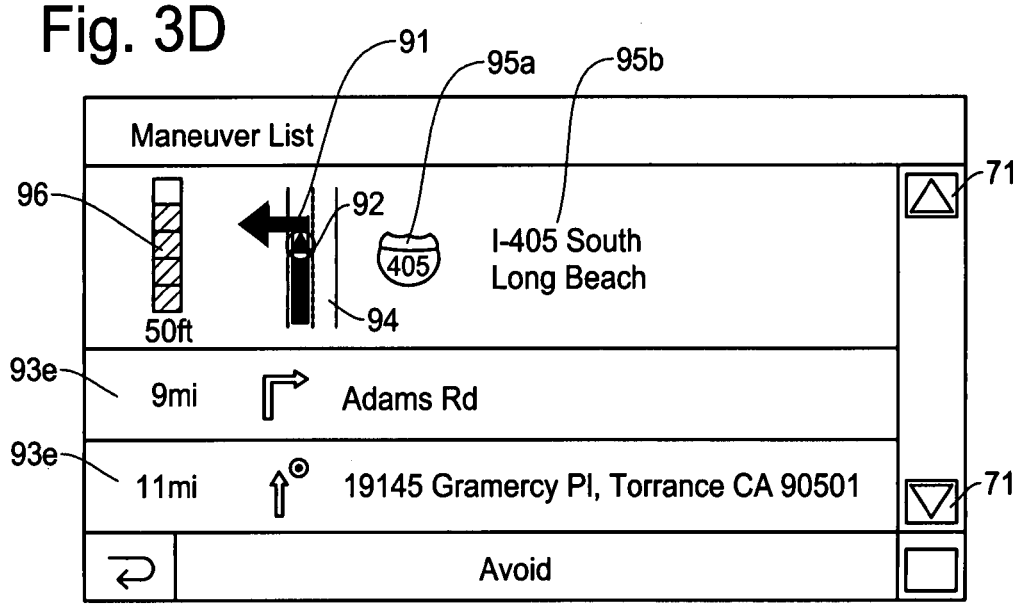

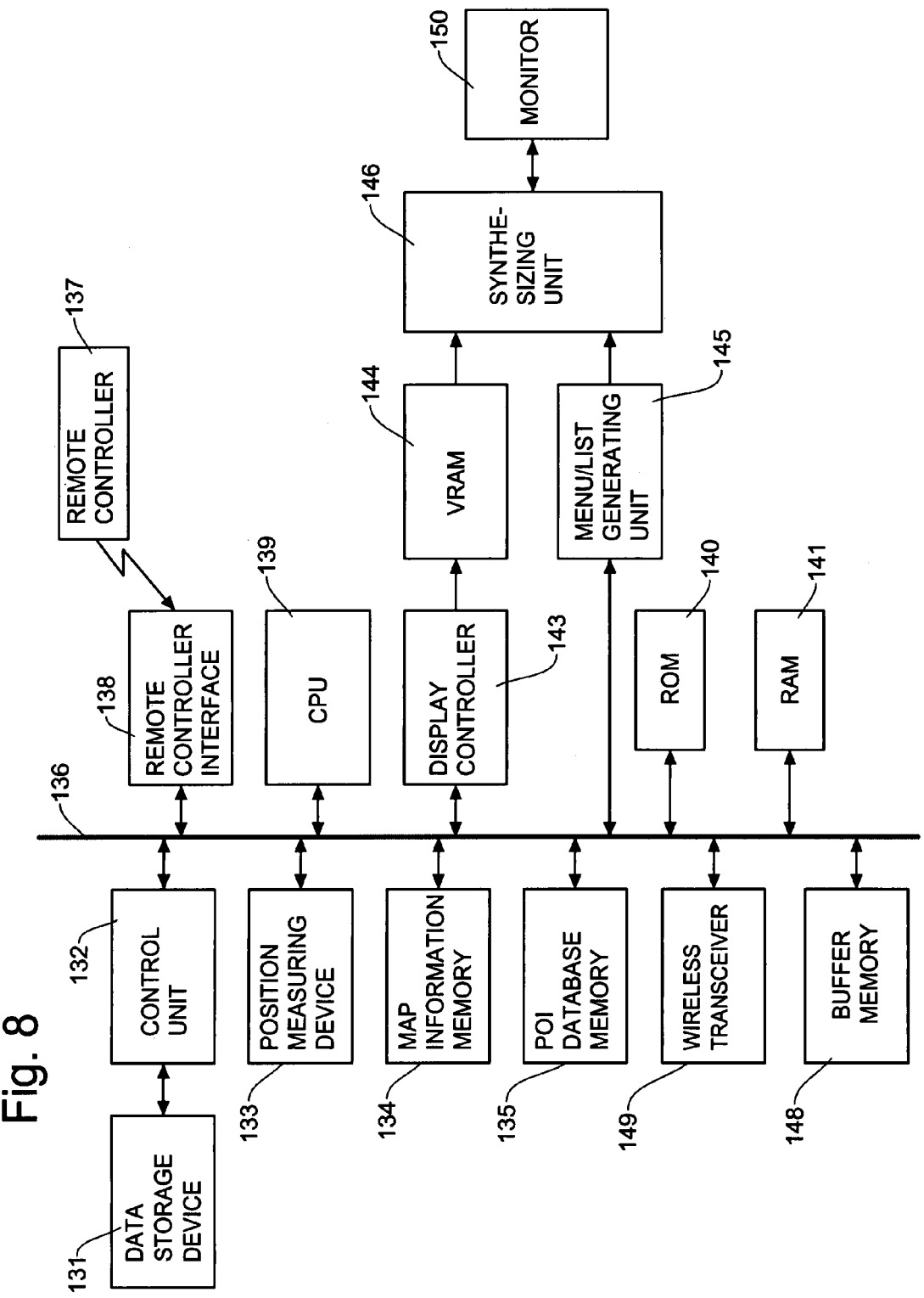

METHOD AND APPARATUS FOR DISPLAYING ROUTE GUIDANCE LIST FOR NAVIGATION SYSTEM

FIELD OF THE INVENTION

This invention relates generally to a display method and apparatus for a navigation system, and more particularly, to a method and apparatus for displaying a route guidance list on a navigation system to provide an intuitive graphic image and text message regarding upcoming maneuvering actions on the route to effectively guide a user to a destination.

BACKGROUND OF THE INVENTION

A navigation system performs travel guidance for enabling a user to easily and quickly reach the selected destination. A typical example is a vehicle navigation system where a vehicle is equipped with a navigation function to guide a driver to a destination through a calculated route. Such a navigation system detects the position of the user's vehicle, and reads out map data pertaining to an area at the current vehicle position from a data storage medium, for example, a CD-ROM (compact disc read-only memory), a DVD (digital versatile disc), or a hard disc. Typically, the navigation system displays a map image on a monitor screen or a turn-by-turn arrow to guide the user to a destination.

FIGS. 1A-1H show an example of overall procedure and screen display involved in the navigation system for route guidance to a destination. FIG. 1A shows an example of locator map screen of the navigation system when the destination is not specified. Typically, the navigation system displays a street on which the vehicle (current vehicle position VP) is running on a map image and a name of the street. Other information such as a north pointer NP, a map scale and a current time may also be illustrated on the display screen.

An example of process for specifying a destination in the navigation system through a Point of Interest (POI) search method is shown in FIGS. 1B-1F. When a user selects to set a destination, the navigation system displays a "Find Destination by" screen as shown in FIG. 1B for specifying an input method for selecting the destination. The "Find Destination By" screen lists various methods for selecting the destination including "Address" for specifying the city and address of the destination, "Intersection" for specifying the names of two streets which intersect with one another, and "Point of Interest (POI)" for selecting the programmed destination based on the name, category or telephone number.

When selecting, the "Point of Interest" method in FIG. 1B, the navigation system displays selection methods of point of interest (POI) either by "Place Name" or "Place Type" in FIG. 1C. The "Place Name" is to specify a name of POI, and the "Place Type" is to specify a category of POI. If the "Place Type" is selected in FIG. 1C, the navigation system lists categories of POIs as shown in FIG. 1D. The user selects a desired category of POIs from the category list.

FIG. 1E shows a screen when the user has selected a "Restaurant" category in the example of FIG. 1D. In this example, the screen includes a list of names of the restaurants typically sorted by distance from the current destination. The user selects a particular restaurant among the restaurant lists for route guidance. As the user selects a desired destination, as shown in the display of FIG. 1F, the user presses an "OK to Proceed" button for route calculation.

In FIG. 1G, the navigation system displays a progress scale during the calculation of the route to the destination. After determining the guidance route, the navigation system starts the route guidance operation as shown in FIG. 1H. A typical navigation system is able to display a route guidance list after determining the calculated route to the destination.

FIG. 2 is an example of a route guidance (maneuver) list displayed on the navigation system screen which lists upcoming maneuvers on the route to guide the user to the destination. The screen shows a list with a plurality of entries, for example, types of turn (maneuvering action) at the intersections and names of street that intersecting with the route to the destination. In this example, each entry in the route guidance list has a distance indicator 83, a maneuver icon 81, and a road (street) name indicator 85.

The distance indicator 83 shows a distance between a current location of the user and the next maneuvering location (intersection) indicated by the road name indicator 85, i.e., the length on the calculated road that the user will drive on the calculated route before the next maneuvering action. The maneuver icon 81 shows the information about the type of maneuvering action, such as making a left turn or a right turn, etc. Other maneuvering actions may be shown such as branching off to the left or right, making a U-turn, etc., at the next maneuvering location. Thus, for the street "RUE DE FORTUNA", the display indicates that the driving distance is 0.7 miles and that the user should make a right turn to get to Bake Parkway. The scroll bar 71 allows the user to see more entries by scrolling the list on the screen.

While the route guidance list shown in the display of FIG. 2 is useful, the driver could still get confused as to the current location and the location requiring a maneuvering action such as making a left turn or right turn (maneuvering location). One of the reasons is that the route guidance list of FIG. 2 still not easily comprehensible for the user. Thus, there is a need of an improved display method and apparatus for a navigation system that provide a more intuitive and prioritized way of displaying the information in a route guidance list.

SUMMARY OF THE INVENTION

It is, therefore, an object of the present invention to provide a display method and apparatus for a navigation system which is capable of displaying a route guidance list which lists information regarding the maneuvering location and action in a more easily comprehensible manner.

It is another object of the present invention to provide a display method and apparatus for a navigation system which displays a route guidance list that is structured in a layered manner so that the information regarding the maneuvering actions at the locations closer to the current position will be prioritized.

It is a further object of the present invention to provide a display method and apparatus for a navigation system which displays a route guidance list in which the information regarding the immediate maneuvering location and action is detailed and enhanced.

It is a further object of the present invention to provide a display method and apparatus for a navigation system which is capable of displaying a route guidance list in which the information regarding the maneuvering location and action will be dynamically changed in response to the changes of the current location of the user.

One aspect of the present invention is a display method for a navigation system to display a route guidance list on a monitor screen in an intuitive and organized manner. The method includes the steps of: calculating a route to a destination specified by a user for performing a route guidance operation to the destination; detecting information concerning upcoming maneuvering actions between a current position of the user to the destination on the calculated route; and displaying a maneuver list which lists information associated with the upcoming maneuvering actions on the calculated route. The maneuver list has a layered structure in which the maneuver list prioritizes the information associated with maneuvering actions at the locations closer to the current position of the user.

The display method further includes a step of changing the information in the maneuver list to reflect changes of the current position of the user. The display method further includes a step of monitoring a distance between locations at which the maneuvering actions are required and the current position of the user and changing the information in the maneuver list to reflect changes of the distance.

In the display method of the present invention, the step of displaying the maneuver list includes a step of displaying the information regarding the most immediate maneuvering action in more detail than that of other maneuvering actions. More specifically, the step of displaying the maneuver list includes a step of displaying the information regarding the most immediate maneuvering action in a size larger than that of other maneuvering actions. Further, the step of displaying the maneuver list includes a step of displaying the information regarding the most immediate maneuvering action with more graphic indicators and icons than that of other maneuvering actions.

In the display method of the present invention, the step of displaying the maneuver list includes a step of displaying a distance countdown meter when the current position of the user is within a predetermined distance range from the location requiring a maneuvering action. The step of displaying the distance countdown meter includes a step of changing the distance countdown meter to reflect changes of distance between a location at which the maneuvering action is required and the current position of the user.

The display method of the present invention further includes a step of shifting the priority to a next upcoming maneuvering action once a current maneuvering action is completed by displaying the information regarding the next upcoming maneuvering action in a detailed and enhanced manner.

In the display method of the present invention, the information regarding the most immediate maneuvering action includes a maneuver icon that shows a type of maneuvering action, a current position indicator that shows a current position of the user which moves on the maneuver icon in response to changes of the current location of the user.

Another aspect of the present invention is a display apparatus for a navigation system to display the route guidance list on a monitor screen by implementing the various steps of the display method described above. The display apparatus of the present invention enables to provide sufficient information in the layered structure in the route guidance list so that the user can quickly and easily grasp the important information regarding the upcoming maneuvering actions at a glance.

According to the present invention, the navigation system displays the route guidance list on the monitor screen in an intuitive and organized manner so that the user can easily understand information regarding the maneuvering location and action associated with the route to the destination. The route guidance list is structured in a layered manner so that the information regarding the maneuvering actions at the locations closer to the current user position will be prioritized. Namely, in the route guidance list, the information regarding the immediate maneuvering location and action is more detailed, enlarged, and highlighted than the others. The navigation system of the present invention displays the route guidance list in which the information regarding the maneuvering location and action will be dynamically changed in response to the changes of the current location of the user. Thus, the route guidance list of the present invention is able to provide the information on the maneuvering locations and maneuvering actions on the calculated route to the destination in a manner that the user can easily understand the information at a glance on the monitor screen, which also promotes the safe driving.

BRIEF DESCRIPTION OF THE DRAWINGS

FIGS. 1A-1H are schematic diagrams showing an example of operational process and screen display involved in the navigation system for selecting a destination, calculating a route to the destination, and conducting a route guidance operation to the destination, etc.

FIGS. 3A to 3F are schematic diagrams showing examples of screen display of the navigation system that include the route guidance list that provides the information regarding upcoming maneuvering actions and locations, traffic signals, names of intersecting streets, etc. on the route to the destination in accordance with the present invention.

FIG. 8 is a block diagram showing an example of configuration of a vehicle navigation system implementing the display method under the present invention.

DETAILED DESCRIPTION OF THE PREFERRED EMBODIMENT

The method and apparatus for displaying a route guidance list on a navigation system is explained in detail with reference to the accompanied drawings. The present invention is designed to display the route guidance list on the monitor screen of a navigation system in an intuitive and organized manner to guide a user to a destination. Once the calculated route to the destination is established, in response to the request by the user, the navigation system displays a route guidance list in which the information directed to the immediate maneuvering actions and locations are prioritized and highlighted.

Thus, the route guidance list of the present invention is able to provide the information on the upcoming locations and maneuvering actions on the calculated route to the destination in a manner that the user can easily understand the information regarding the type of maneuver, how soon the next maneuvering action must be made, etc. at a glance on the monitor screen. It should be noted that the present invention is described mainly for the case where the display method and apparatus is applied to a vehicle navigation system, but the method and apparatus under the present invention can be implemented to other devices, such as portable devices or personal computers.

Figure 2:
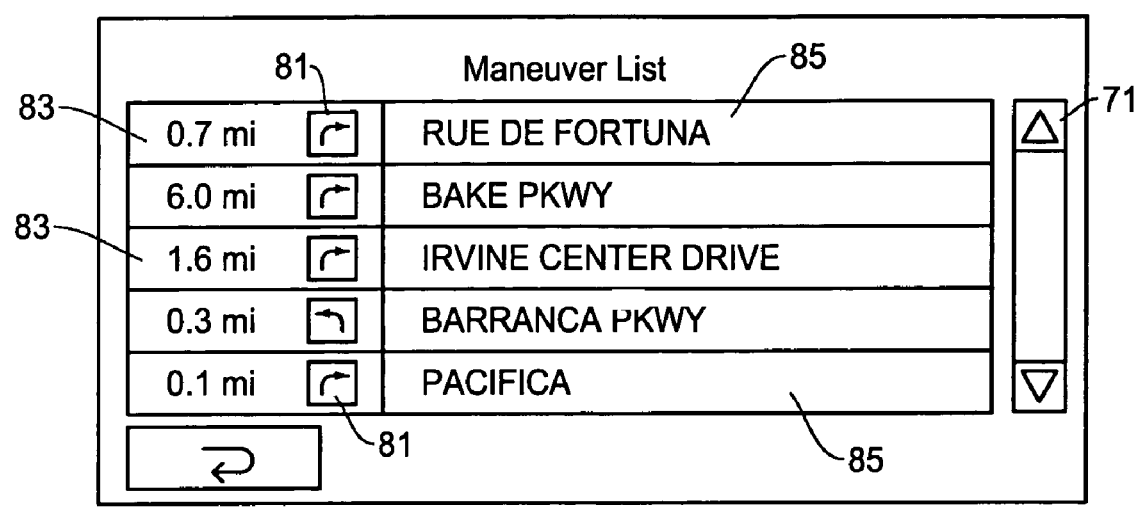
FIG. 2 is a display example of a guidance list which lists maneuvering actions and locations on the route to guide the user to the destination in a conventional navigation system.
Figure 3A:
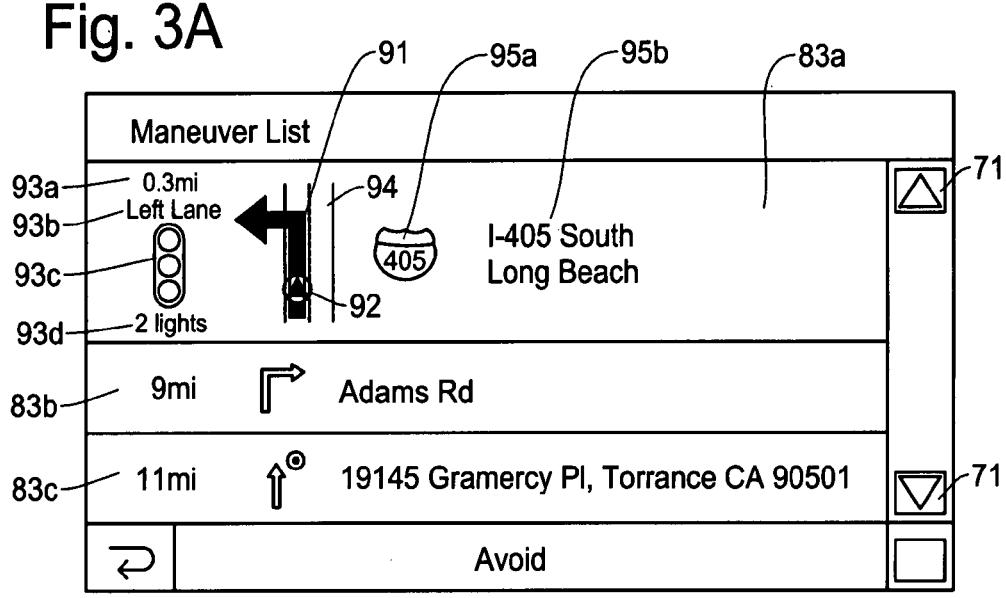

FIGS. 3A to 3F are schematic diagrams showing examples of navigation screen that display the route guidance list (maneuver list), especially, various arrangements for displaying upcoming maneuvers, traffic signals, etc. on the route to the destination in accordance with the present invention. As shown in FIG. 3A, the route guidance list under the present invention lists entries (data fields) 83*a*, 83*b* and 83*c* that indicate the upcoming maneuvers on the route to the destination in the order of distance from the current user (vehicle) position. Scroll keys 71 on the screen allow the user to scroll the route guidance list to see further entries if any.

In the present invention, as shown in FIGS. 3A-3D, the route guidance list has a layered structure to prioritize the information associated with maneuvering actions at the locations closer to the current vehicle position. Thus, the first entry (data field) 83*a* differs from the rest of the entries (data fields) 83*b* and 83*c* in that the first entry 83*a* shows the information in more detail with larger graphic images or icons because it relates to the next immediate action (maneuver). In this example, the entry (data field) 83*a* includes a maneuver icon 91, a current position indicator 92, a maneuvering point (intersection) indicator 93 (93*a*-93*d*), a street icon 94, a street indicator 95 (95*a* and 95*b*). Depending on the changes of the current location of the user (vehicle), these icons, indicators and text messages will dynamically change their contents, positions, and sizes.

The maneuver icon 91 is an icon that shows a type of maneuver (ex. right turn, left turn, U-turn, etc.) at the next maneuvering location (intersection). In this example, the maneuver icon 91 indicates that the next maneuvering action is a left turn by orienting the arrow shape in the left direction. The maneuver icon 91 in the entry 83*a* is larger and more enhanced (ex. brightened) than the other maneuver icons in the entries 83*b* and 83*c* as will be described in more detail and is capable of providing additional information associated with the maneuver.

The current position indicator 92 is superposed with the maneuver icon 91 to show the relative positional relationship therebetween. In this example, the current position indicator 92 and the maneuver icon 91 are located on the left side of the street icon 94 because the next maneuvering action is the left turn. Since the current position of the vehicle is close to the next maneuvering location (intersection) indicated by the maneuvering point indicator 93, the current position indicator 92 and the maneuver icon 91 are overlapped with one another.

Namely, the current position indicator 92 shows a relative position of the vehicle in relation to the location of the intersection requiring the next maneuvering action. In other words, the locations on the maneuver icon 91 are indicative of the locations of the current user (vehicle) position on the calculated route to the destination. The position of the current position indicator 92 on the maneuver icon 91 changes dynamically to reflect the changes of the current position of the user (vehicle).

In this example, the maneuvering point indicator 93 as a whole is comprised of a distance indicator 93*a*, a lane guidance indicator 93*b*, a traffic light icon 93*c*, and a traffic signal number indicator 93*d*. The distance indicator 93*a* shows the distance to the location (intersection) where making the maneuver indicated in the maneuver icon 91 will be required. In FIG. 3A, the distance indicator 93*a* shows that the distance to the maneuvering location is 0.3 miles. The distance shown in the distance indicator 93*a* is dynamically updated in response to the change of the current position of the vehicle.

The lane guidance indicator 93*b* provides information regarding which lane the vehicle should proceed on the calculated route for the next maneuvering action for assisting the driver to perform a smooth maneuvering action at the intersection. In the example shown in FIG. 3A, the lane guidance indicator 93*b* shows "Left Lane" to tell the driver to proceed on the left lane of the calculated road. As noted above, such lane guidance information is also shown graphically by the current position indicator 92 and the maneuver icon 91 that are located on the left side of the street icon 94.

The traffic signal icon 93*c* graphically shows information regarding traffic signals between the current position and the next intersection that involves the maneuvering action. In this example, below the traffic signal icon 93*c*, the traffic signal number indicator 93*d* is provided, which indicates how many traffic lights the user will pass before arriving at the next maneuvering location. The traffic signal number indicator 93*d* also changes dynamically to reflect the changes of the current position of the user in relation to the location requiring the maneuvering action.

The street indicator 95 includes a street type icon 95*a* that shows the name and type of the street where the maneuvering will be required, i.e., the next street that intersecting with the road that the user is currently running thereon. The street indicator 95 also includes a street name indicator 95*b* that shows a particular street (road) name in a text form, which is, in this case an "Interstate Highway 405". Preferably, the street name indicator 95*b* also shows the information regarding the entrance of the highway such as "South", "North", etc.

Figure 3B:
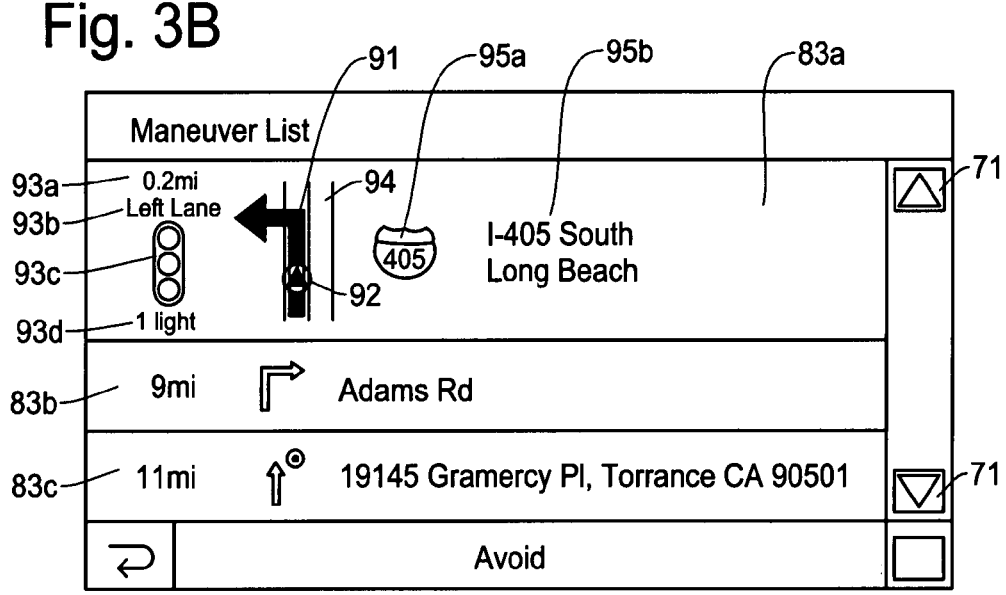

FIG. 3B is a display of the route guidance list similar to that of FIG. 3A except that the vehicle has moves toward the maneuvering location by about 0.1 miles. The distance indicator 93*a* and the light number indicator 93*d* change dynamically to reflect the changes of the current vehicle position in relation to the location requiring the maneuvering. In this example, the distance indicator 93*a* now reads 0.2 miles and the traffic signal number indicator 93*d* now reads one (1) light.

As noted above, the position of the current position indicator 92 on the maneuver icon 91 is also changed to reflect the current position. As the vehicle further advances to the location requiring the indicated maneuvering action, the screen shown in FIG. 3C will be displayed. A distance countdown meter 96 is provided in the list which shows graphic information on the distance between the maneuvering location and the current vehicle position in a more precise and intuitive manner.

The distance countdown meter 96 appears when the vehicle enters into a predetermined distance range from the maneuvering location, for example, 600 feet. The distance countdown meter 96 is configured by a scale-like shape on which the brightness, shading, color, etc. will change upon the changes of the current vehicle position. As noted above, the current position indicator 92 on the maneuver icon 91 also changes its position as the relative position of the vehicle to the maneuvering location changes.

FIG. 3D shows a display example of the route guidance list similar to that of FIG. 3C except that the vehicle has further advanced to the maneuvering location. As shown, the scaling (distance/unit) on the distance countdown meter 96 becomes further small so that it shows a more precise distance between the current vehicle position and the next maneuvering location. The current position indicator 92 further changes upward on the screen as the vehicle further approaches the maneuvering location.

Thus, since the current position indicator 92 and the distance countdown meter 96 dynamically change the location as the vehicle moves, the driver can easily comprehend the relative location of the vehicle with respect to the intersection and prepare for the maneuvering action. In the embodiment described above, the distance countdown meter 96 begins to appear when the vehicle reaches to a distance range of 600 feet to the maneuvering location. However, the navigation system may use other threshold criteria to display the distance countdown meter 96, for instance, when the vehicle reaches 200 feet to the maneuvering location.

Moreover, the distance countdown meter 96 may alternatively be displayed even though the current vehicle position is outside of the predetermined distance range. For example, when no more traffic signal exists between the current vehicle position and the maneuvering location, the navigation system displays the distance countdown meter 96 instead of the traffic light icons 93*c* and the traffic signal number indicator 93*d*. In addition to the distance countdown meter 96, it is preferable that the navigation system provides the voice announcement regarding the distance to the maneuvering location and the required maneuvering action (ex. "make left turn").

It is also possible to display a name of a crossing street that comes prior to the location requiring the maneuvering action. For example, if there is a crossing street named "Michaelson" prior to the maneuvering location, the navigation system displays the street name "Michaelson". This allows the driver to mentally prepare for the maneuvering action after passing the street "Michaelson". Other landmarks such as lake, river, mountain, monument, etc., may be used as well for the maneuver list by incorporating the corresponding icons, map images or text data indicating such landmarks.

Figure 3E:
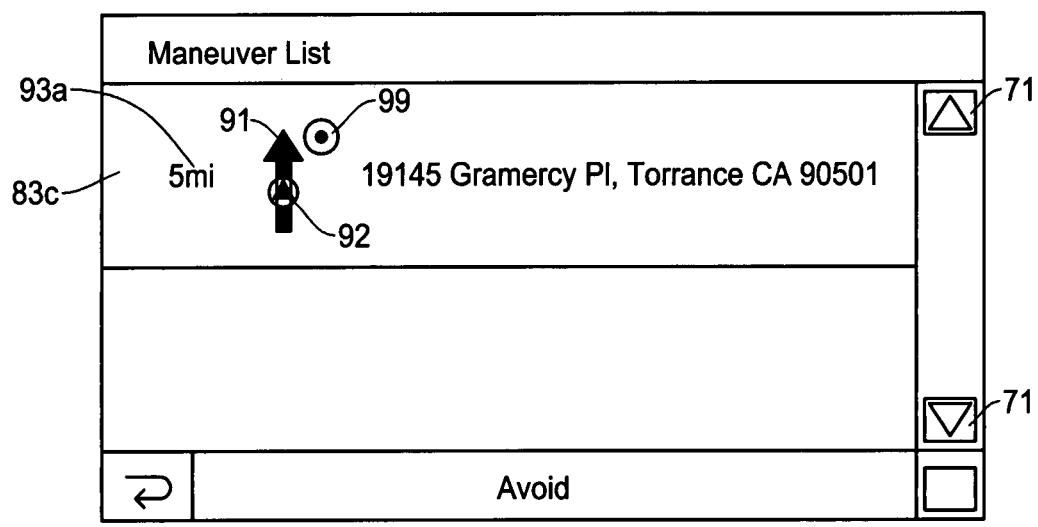

FIG. 3E shows another display example of the route guidance (maneuver) list under the present invention where the vehicle further has advanced to the area indicated by the entry 83*c*. In this example, the vehicle is approaching the destination where a destination indicator 99 indicates the location of the destination. Similar to that described in the foregoing, the maneuver icon 91 shows the type of maneuvering action on which the current position indicator 92 dynamically moves by reflecting the current vehicle position in relation to the destination.

Figure 3F:
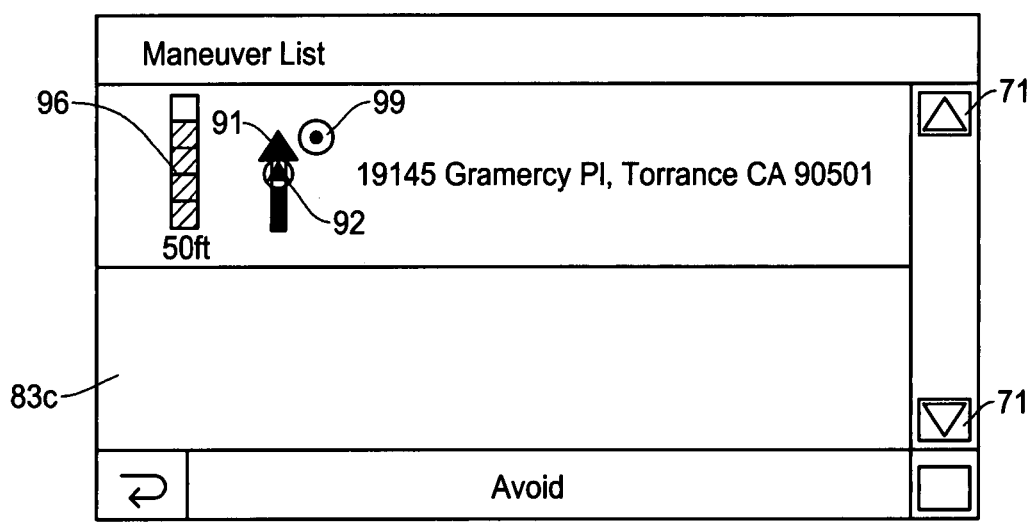

FIG. 3F is a display example similar to that shown in FIG. 3E except that the vehicle has almost arrived at the destination marked by the destination indicator 99. Since the vehicle is now within the predetermined range from the destination, the distance countdown meter 96 is displayed to indicate the distance or relative position of the vehicle to the destination. The distance countdown meter 96 works in the similar way as described above by showing the scale-like figure which is either shaded, brightened, or color changed to show the decreasing distance to the destination.

Figure 4A:
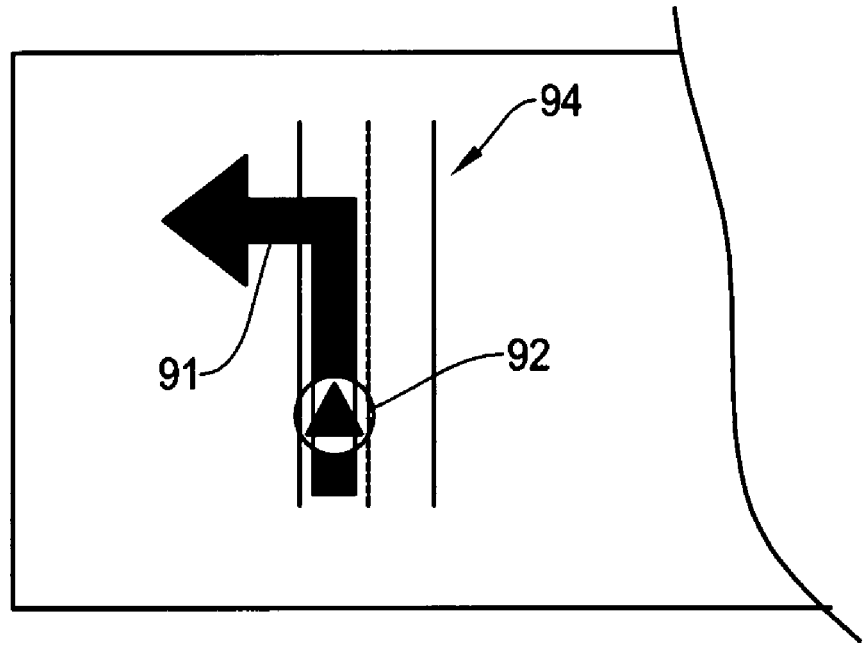
FIGS. 4A and 4B are schematic diagrams showing enlarged views of the icons used in the route guidance list of the present invention.
Figure 4B:
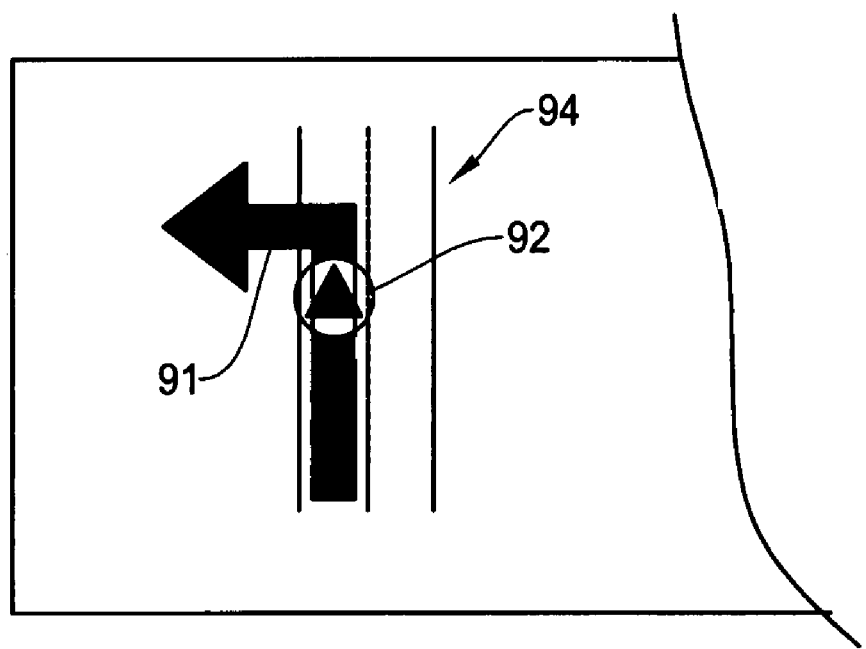

FIGS. 4A and 4B show enlarged views of the current position indicator 92 and the maneuver icon 91 to more clearly show the relationship between the current position indicator 92 and the maneuver icon 91. In this example, the current position indicator 92 and the maneuver icon 91 are located on the left side of the street icon 94 because the next maneuvering action is the left turn. As the vehicle approaches the maneuvering location, the current position indicator 92 will move upward on the maneuver icon 91 to reflect the movement of the vehicle.

Figure 5A:
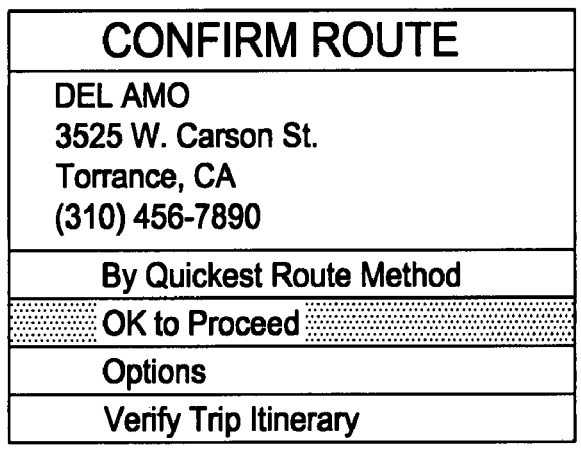
FIGS. 5A-5F are schematic diagrams showing examples of screens and processes for selecting a destination and displaying a selected type of list on the navigation system of the present invention.
Figure 5B:
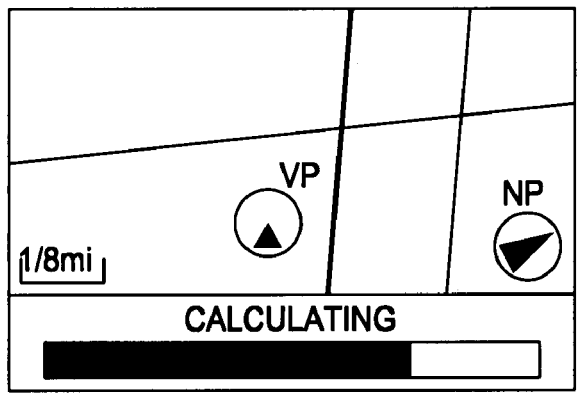

FIGS. 5A-5F are schematic diagrams showing examples of screen and process for selecting a destination and displaying a selected type of list on the navigation system of the present invention. FIG. 5A shows the screen where the user confirms the destination similar to the that of FIG. 1F. In FIG. 5B, the navigation system calculates an optimum route to the destination. The progress of calculation can be indicated by the bar indicator at the bottom in the display of FIG. 5B.

Figure 5C:
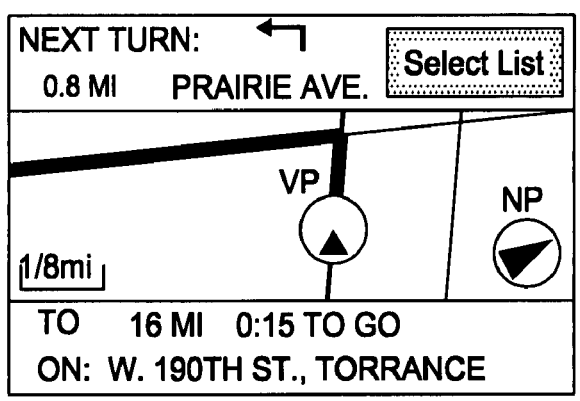
Figure 5D:
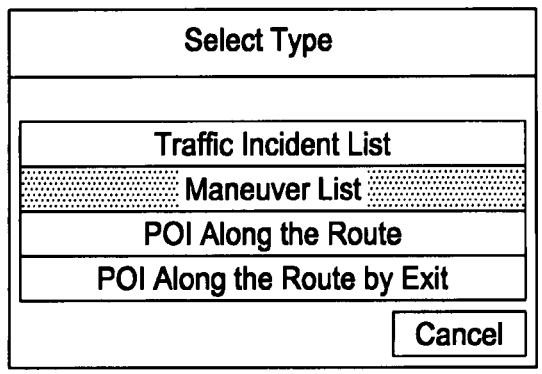

After the calculated route is produced, the navigation system moves to a route guidance mode, such as an intersection guidance as shown in FIG. 5C, so that the user can follow the calculated route to the destination. If the user wants to see a maneuvering list, traffic incidence list, etc., he activates the "Select List" key at the upper right of the screen of FIG. 5C. Consequently, the navigation system displays a,"Select Type" screen as shown in FIG. 5D which prompts the user to select the type of list to be displayed. In the example of FIG. 5D, the "Select Type" screen shows "Traffic Incident List", "Maneuver List", "POI Along the Route", and "POI Along the Route by Exit" for the user to select one of them.

Figure 5E:
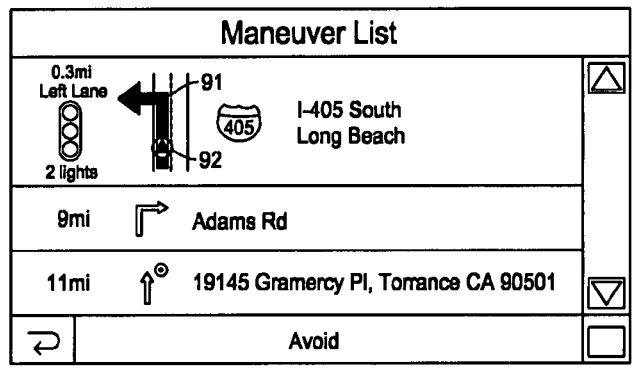
Figure 5F:
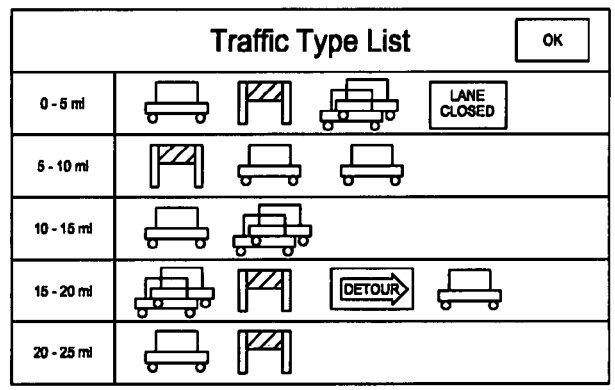

In the case where the user selects "Maneuver List", the navigation system displays a list of maneuvers as shown in FIG. 5E which is similar to that of FIGS. 3A and 3B. The maneuvers are listed in the order of distance from the current user (vehicle) position. Thus, the user is able to see the upcoming maneuvers on the calculated route in the maneuver list which has a layered structure as described above with reference to FIGS. 3A-3D. Namely, the maneuver list prioritizes the information associated with maneuvering actions at the locations closer to the current vehicle position. In the case where the user selects "Traffic Incident List" in FIG. 5D, the navigation system displays a list of traffic incidents associated with the calculated route as shown in FIG. 5F.

Figure 6:
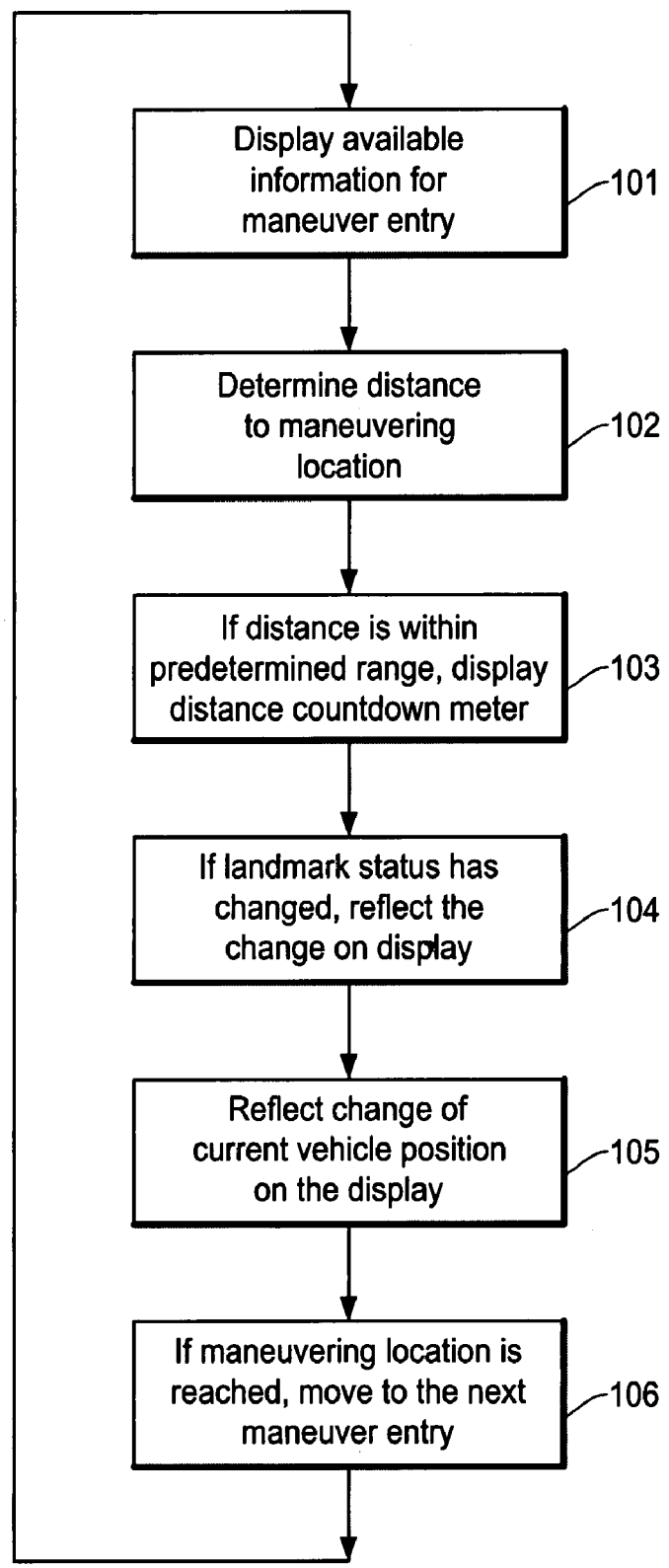
FIG. 6 is a flow chart showing an example of basic operational steps for displaying the route guidance list in accordance with the present invention.

FIG. 6 is a flow chart showing an example of basic operational steps for displaying the route guidance (maneuver) list in accordance with the present invention. When the user selects the maneuver list on the screen, for example shown in FIG. 5D, the navigation system displays available information regarding upcoming maneuvers in the maneuver list in the step 101. The available information includes the type of maneuvering action, distance to the maneuvering location, the name of the intersecting road, the number of traffic signals, the lane information, etc., as described above with reference to FIG. 3A. Such maneuvering actions, locations, etc., are listed in the maneuver list in the order of distance from the current user (vehicle) position.

The navigation system constantly checks the current location of the vehicle and determines the distance to the maneuvering location in the step 102. If the distance to the maneuvering location is within a predetermined distance range, in the step 103, the navigation system will show the distance countdown meter 96 shown in the display example of FIGS. 3C and 3D. The example of distance range is several hundred feet and the distance countdown meter 96 has a scale-like shape which changes its brightness, color, shading, etc. by reflecting the changes of the distance between the maneuvering location (intersection) and the current vehicle position.

The navigation system will determine whether the landmark information needs to be changed due to the change of the current location of the vehicle, and if so, reflect the change on the display in the step 104. The landmark information is any information that helps the user to confirm the geographical location, which may include, for example, a crossing road just prior to the next maneuvering location or a number of traffic signals ahead before the maneuvering location as described above. Other landmarks such as lake, river, mountain, monument, etc., may be used as well for the maneuver list by incorporating the corresponding icons, map images or text data indicating such landmarks.

The navigation system will reflect the change of the current vehicle position on the route guidance (maneuver) list in the step 105. The maneuver list includes the icons and graphic indicators in addition to the text messages as noted above for enabling the user to easily associate the current location to the maneuvering location and required maneuvering actions. Thus, changes of the current vehicle position are dynamically reflected on the display to provide an accurate reading of the current vehicle location in relation to the maneuvering location. For example, in the embodiment shown in FIGS. 3A-3F, the distance indicator 93a and the distance countdown meter 96 as well as the current position indicator 92 on the maneuver icon 91 will change at every change of the current vehicle position.

If the navigation system detects that the maneuvering location has already reached and the user has successfully passed the maneuvering location, the maneuver list will be updated such that the next entry will be prioritized with a detailed and enhanced view in the step 106. Namely, the maneuver list is designed to prioritize the information associated with the most immediate upcoming maneuvering action. Once the current maneuvering action is completed, the priority is shifted to the next upcoming maneuvering action. Thus, in FIGS. 3A-3D, after completing the maneuvering action shown in the first entry (data field) 83a, the information regarding the maneuvering action in the second entry (data field) 83b will be displayed in detail with highlight. The foregoing steps 101-106 will be repeated for the calculated route until the user (vehicle) arrives at the destination.

Figure 7:
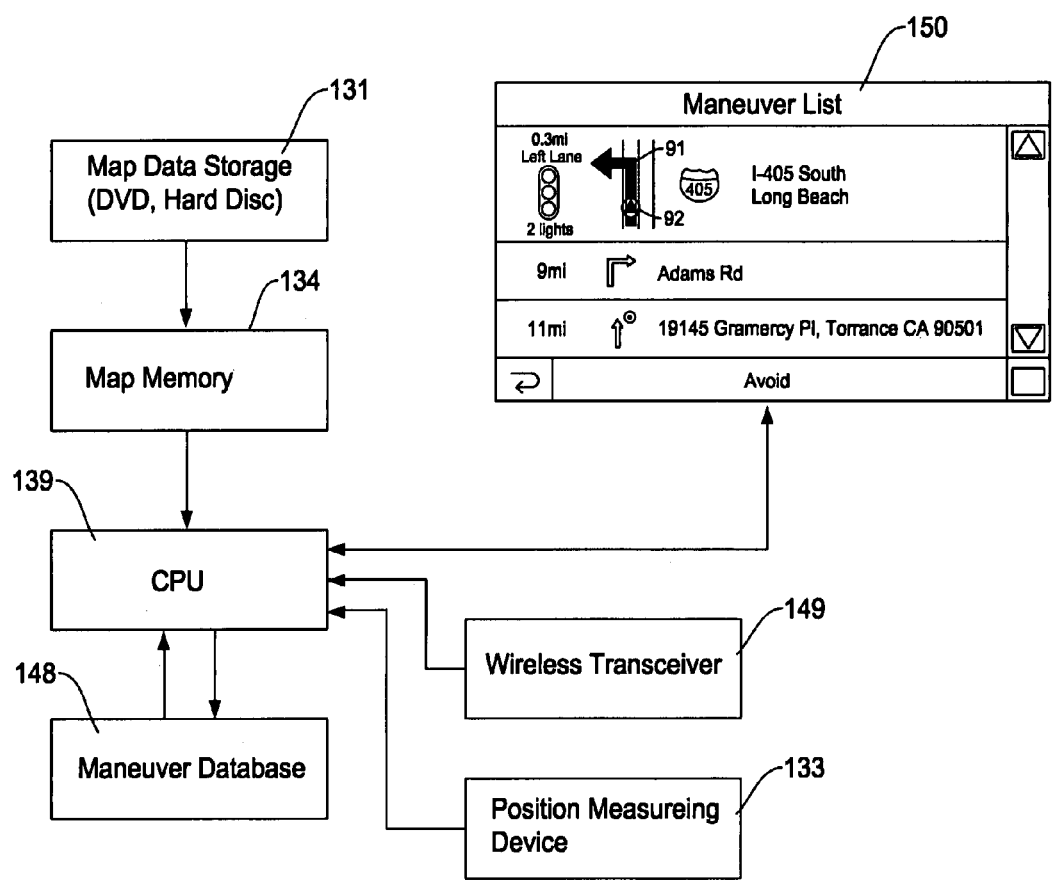
FIG. 7 is a functional block diagram showing an example of basic structure for displaying the route guidance list in accordance with the present invention.

FIG. 7 is a functional block diagram showing an example of basic structure of the apparatus of the present invention for displaying the maneuver list during the route guidance operation of the navigation system. The structure of FIG. 7 is applicable to any electronic device having a navigation function which enables the electronic device to guide the user to a particular location as noted above. The apparatus of the present invention includes a monitor 150 for interfacing with the user, and a guidance list display controller (CPU) 139 for controlling an overall operation of the apparatus of the present invention.

The block diagram of FIG. 7 further includes a map data storage 131 such as a DVD or a hard disc for storing map data, a map memory 134 for storing a required portion of the map data retrieved from the map data storage 131, a position measuring device 133 for determining the current position of the user (vehicle), a wireless transceiver 149 for wireless communication with remote data server such as a traffic information service provider, and a buffer memory 148 for storing the data regarding the maneuvers on the calculated route to the destination for processing and operation of the display apparatus.

In FIG. 7, the display apparatus of the present invention is able to retrieve the map data from the map data storage 131 and map memory 134. The display apparatus implementing the present invention is also able to retrieve such map data from a remote data server through the wireless transceiver 149. The CPU 139 controls an overall operation of monitoring a distance between the upcoming maneuvering points and the current vehicle (user) position and creating the maneuvering list which will be dynamically changed depending on the changes of the location of the user.

Based on the map data retrieved from the map data storage 131 and the data from the position measuring device 133, the display apparatus creates a route guidance list associated with the calculated route to the destination. For example, the route guidance list is created by detecting the information associated with the upcoming maneuvering actions on the calculated route from the retrieved map data and current position data. The data related to the maneuver list will be stored in the maneuver database (buffer memory) 148 to modify and display the maneuver list on the monitor 150 by reflecting the change of the current position.

The information in the maneuver list may include the type of maneuvering action, distance to the maneuvering location, the name of the intersecting road, the number of traffic signals, the lane information, etc., as described above with reference to FIGS. 3A-3D. Such maneuvering actions, locations, etc., are listed in the maneuver list in the order of distance from the current user (vehicle) position. As noted above, the maneuver list has a layered (hierarchical) structure, i.e., it prioritizes the information associated with maneuvering actions at the locations closer to the current vehicle position.

The display apparatus constantly checks the current location of the vehicle and determines the distance to the maneuvering location. If the distance to the maneuvering location is within a predetermined distance range, the display apparatus shows the distance countdown meter 96 shown in the display example of FIGS. 3C and 3D. The display apparatus incorporates the changes of the current vehicle position so that the information in the maneuver list is dynamically changed to provide accurate and detailed information regarding the maneuvering location and action in an easily comprehensible manner.

If the user has successfully passed the maneuvering location, the maneuver list will be updated such that the next entry will be prioritized with detailed information and enlarged graphical icons, etc. In other words, the route guidance (maneuver) list is designed to prioritize the information associated with the most immediate upcoming maneuvering action, and once the current maneuvering location is completed, the priority is shifted to the next upcoming maneuvering action. Thus, after completing the current maneuvering action, the information regarding the next maneuvering action will be displayed in a detailed and enhanced manner.

FIG. 8 shows an embodiment of the structure of a vehicle navigation system for implementing the present invention. While the vehicle navigation system is explained for an illustration purpose, the present invention can also be applied to other types of navigation system, such as a portable navigation device implemented by a PDA (personal digital assistant) device, other hand-held devices such as a wireless telephone, or a laptop or notebook computer.

In the block diagram, the functional blocks identical to that of FIG. 7 are denoted by the same reference numerals. The navigation system includes a map data storage 131 such as a hard disc, CD-ROM, DVD or other storage means for storing the map data. The map data storage 131 has data necessary to provide lane information and traffic signal number information, and other landmark information for the guidance maneuver list of the present invention described above. The navigation system includes a control unit 132 for controlling an operation for reading the information from the map data storage 131, and a position measuring device 133 for measuring the present vehicle position or user position. For example, the position measuring device 133 has a vehicle speed sensor for detecting a moving distance, a gyroscope for detecting a moving direction, a microprocessor for calculating a position, a GPS (global positioning system) receiver for receiving and analyzing GPS signals, and etc.

The block diagram of FIG. 8 further includes a map information memory 134 for storing the map information which is read from the map data storage 131, a database memory 135 for storing database information such as point of interest (POI) information which is read out from the map data storage 131, a remote controller 137 for executing a menu selection operation, an enlarge/reduce operation, a destination input operation, etc. and a remote controller interface 138. Although a remote controller is a typical example for selecting menus, executing selected functions and etc., the navigation system includes various other input methods to achieve the same and similar operations done through the remote controller.

In FIG. 8, the navigation system further includes a bus 136 for interfacing the above units in the system, a processor (CPU) 139 for controlling an overall operation of the navigation system, a ROM 140 for storing various control programs such as a route search program and a map matching program necessary for navigation control, a RAM 141 for storing a processing result such as a guide route, a display controller 143 for generating map image (a map guide image and an arrow guide image) on the basis of the map information, a VRAM 144 for storing images generated by the display controller 143, a menu/list generating unit 145 for generating menu image/various list images, a synthesizing unit 146, a wireless transceiver 149 for wireless communication to retrieve data from a remote server, a buffer memory, 148 for temporally storing data for ease of data processing, and a monitor (display) 150.

The navigation system of the present invention is able to retrieve the map data from the map data storage 131 and map memory 134. The CPU 139 controls an overall operation of monitoring a distance between the upcoming maneuvering points and the current vehicle position and creating the maneuver list which will be displayed on the monitor screen 150 and will be dynamically changed depending on the changes of the location of the vehicle. Based on the map data retrieved from the map data storage 131 and the data from the position measuring device 133, the navigation system creates a route guidance list associated with the calculated route to the destination. The data related to the maneuver list will be stored in the buffer memory 148 for further processing. As noted above, the maneuver list has a layered structure, i.e., it prioritizes the information associated with maneuvering actions at the locations closer to the current vehicle position.

The navigation system constantly checks the current location of the vehicle and determines the distance to the maneuvering location. If the distance to the maneuvering location is within a predetermined distance range, the navigation system displays the distance countdown meter noted above. The navigation system incorporates the changes of the current vehicle position so that the information in the maneuver list is dynamically changed to provide accurate and detailed information regarding the next immediate maneuvering location and maneuvering action.

If the user has successfully passed the maneuvering location, the maneuver list will be updated such that the next entry will be prioritized with detailed information and enlarged graphical icons, etc. In other words, the route guidance (maneuver) list is designed to prioritize the information associated with the most immediate upcoming maneuvering action, and once the current maneuvering location is completed, the priority is shifted to the next upcoming maneuvering action. Thus, after completing the current maneuvering, the navigation system displays the information regarding the next maneuvering action in a detailed and enhanced manner.

As has been described above, according to the present invention, the navigation system displays the route guidance list on the monitor screen in an intuitive and organized manner so that the user can easily understand information regarding the maneuvering location and action associated with the route to the destination. The route guidance list is structured in a layered manner so that the information regarding the maneuvering actions at the locations closer to the current user position will be prioritized. Namely, in the route guidance list, the information regarding the immediate maneuvering location and action is more detailed, enlarged, and highlighted than the others. The navigation system of the present invention displays the route guidance list in which the information regarding the maneuvering location and action will be dynamically changed in response to the changes of the current location of the user. Thus, the route guidance list of the present invention is able to provide the information on the maneuvering locations and actions on the calculated route to the destination in a manner that the user can easily understand the information at a glance on the monitor screen, which also promotes the safe driving.

Although the invention is described herein with reference to the preferred embodiment, one skilled in the art will readily appreciate that various modifications and variations may be made without departing from the spirit and scope of the present invention. Such modifications and variations are considered to be within the purview and scope of the appended claims and their equivalents.

What is claimed is:

1. A display method for a navigation system, comprising the following steps of:
    calculating a route to a destination specified by a user for performing a route guidance operation to the destination;
    detecting information concerning upcoming maneuvering actions between a current position of the user to the destination on the calculated route; and
    displaying a maneuver list which lists information associated with the upcoming maneuvering actions on the calculated route;
    wherein the maneuver list has a layered structure having two or more entries on a display screen in which the entries associated with maneuvering actions at the locations closer to the current position of the user are prioritized; and
    wherein each of the entries in the maneuver list includes a graphic representation of the maneuvering action and the prioritized entry is graphically enhanced by an increased size and more graphic indicators and icons than the other entries.

2. The display method for a navigation system as defined in claim 1, further comprising a step of changing the information in the maneuver list to reflect changes of the current position of the user.

3. The display method for a navigation system as defined in claim 1, further comprising a step of monitoring a distance between locations at which the maneuvering actions are required and the current position of the user and changing the information in the maneuver list to reflect changes of the distance.

4. The display method for a navigation system as defined in claim 1, wherein said step of displaying the maneuver list includes a step of displaying the information regarding the most immediate maneuvering action in more detail than that of other maneuvering actions.

5. The display method for a navigation system as defined in claim 4, wherein said information regarding the most immediate maneuvering action includes a maneuver icon that shows a type of maneuvering action, a current position indicator that shows a current position of the user which moves on the maneuver icon in response to changes of the current location of the user.

6. The display method for a navigation system as defined in claim 1, wherein said step of displaying the maneuver list includes a step of displaying the information regarding the most immediate maneuvering action in a size larger than that of other maneuvering actions.

7. The display method for a navigation system as defined in claim 1, wherein said step of displaying the maneuver list includes a step of displaying a distance countdown meter when the current position of the user is within a predetermined distance range from the location requiring a maneuvering action.

8. The display method for a navigation system as defined in claim 7, wherein said step of displaying the distance countdown meter includes a step of changing the distance countdown meter to reflect changes of distance between a location at which the maneuvering action is required and the current position of the user.

9. The display method for a navigation system as defined in claim 1, further comprising a step of shifting the priority to a next upcoming maneuvering action once a current maneuvering action is completed by displaying the information regarding the next upcoming maneuvering action in a detailed and enhanced manner.

10. An display apparatus for a navigation system, comprising:
   means for calculating a route to a destination specified by a user for performing a route guidance operation to the destination;
   means for detecting information concerning upcoming maneuvering actions between a current position of the user to the destination on the calculated route; and
   means for displaying a maneuver list which lists information associated with the upcoming maneuvering actions on the calculated route;
   wherein the maneuver list has a layered structure having two or more entries on a display screen in which the entries associated with maneuvering actions at the locations closer to the current position of the user are prioritized; and
   wherein each of the entries in the maneuver list includes a graphic representation of the maneuvering action and the prioritized entry is graphically enhanced by an increased size and more graphic indicators and icons than the other entries.

11. The display apparatus for a navigation system as defined in claim 10, further comprising means for changing the information in the maneuver list to reflect changes of the current position of the user.

12. The display apparatus for a navigation system as defined in claim 10, further comprising means for monitoring a distance between locations at which the maneuvering actions are required and the current position of the user and changing the information in the maneuver list to reflect changes of the distance.

13. The display apparatus for a navigation system as defined in claim 10, wherein said means for displaying the maneuver list includes means for displaying the information regarding the most immediate maneuvering action in more detail than that of other maneuvering actions.

14. The display apparatus for a navigation system as defined in claim 13, wherein said information regarding the most immediate maneuvering action includes a maneuver icon that shows a type of maneuvering action, a current position indicator that shows a current position of the user which moves on the maneuver icon in response to changes of the current location of the user.

15. The display apparatus for a navigation system as defined in claim 10, wherein said means for displaying the maneuver list includes means for displaying the information regarding the most immediate maneuvering action in a size larger than that of other maneuvering actions.

16. The display apparatus for a navigation system as defined in claim 10, wherein said means for displaying the maneuver list includes means for displaying a distance countdown meter when the current position of the user is within a predetermined distance range from the location requiring a maneuvering action.

17. The display apparatus for a navigation system as defined in claim 16, wherein said means for displaying the distance countdown meter includes means for changing the distance countdown meter to reflect changes of distance between a location at which the maneuvering action is required and the current position of the user.

18. The display apparatus for a navigation system as defined in claim 10, further comprising means for shifting the priority to a next upcoming maneuvering action once a current maneuvering action is completed by displaying the information regarding the next upcoming maneuvering action in a detailed and enhanced manner.

* * * * *